July 14, 1925.                                                                1,545,716
A. WEISS
ATTACHMENT FOR TAXIMETER VEHICLES
Original Filed March 6, 1923
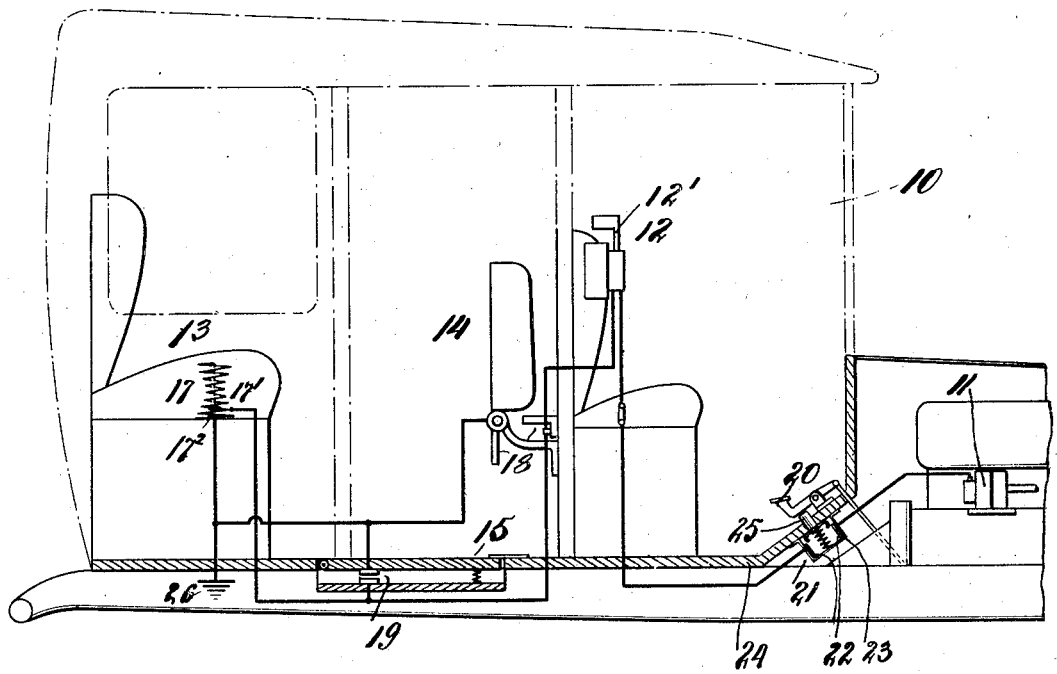
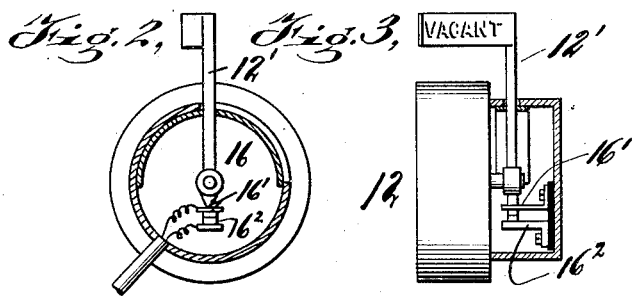
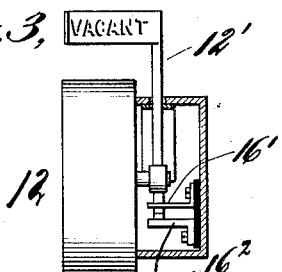
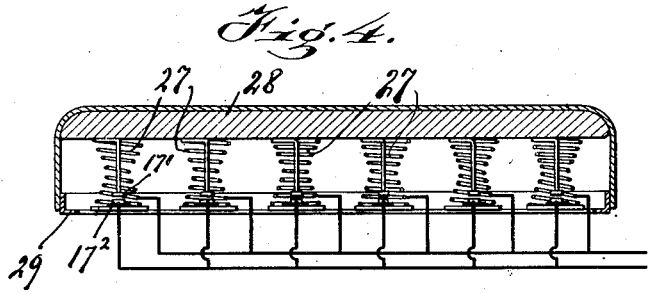
INVENTOR
Abraham Weiss
BY Max H. Ordmann
ATTORNEY Patented July 14, 1925.

1,545,716

UNITED STATES PATENT OFFICE.

ABRAHAM WEISS, OF NEW YORK, N. Y.

ATTACHMENT FOR TAXIMETER VEHICLES.

Application filed March 6, 1923, Serial No. 623,080. Renewed May 14, 1925.

*To all whom it may concern:*

Be it known that I, ABRAHAM WEISS, a citizen of the United States, residing at New York, in the county of New York and State of New York, have invented certain new and useful Improvements in Attachments for Taximeter Vehicles, of which the following is a specification.

This application is a continuation in part of the one filed January 23, 1923, Serial No. 614,363. The invention relates to attachments for taximeter vehicles for controlling the operation of the vehicle. In my application above referred to, I have described an electric controlling system arranged directly between the ignition system on one hand and pressure operated switches in the passenger compartment and a flag controlled switch on the other hand. This system, however, I have found in practice, does not answer all requirements. Thus, for instance, the motor cannot be started to run idle, as it is often desired, on cold winter days, when the driver, while waiting for a passenger, occupies the passenger compartment. To remove this drawback, I introduce in the electric controlling circuit an additional switch, which will be operated through the medium of the accelerator or gas supply means, so that the grounding of the ignition circuit will not take place by the mere occupancy of the passenger compartment, but only when the driver, without lowering the flag, attempts to run the car with speed, i. e. presses on the accelerator pedal.

Another object of this invention is to simplify the construction of the main seat switch.

With these and other objects in view, my invention consists in the novel construction, arrangement and combination of parts, as will be hereinafter more fully described and defined in the appended claims.

In the accompanying drawing, in which similar reference characters denote corresponding parts, Fig. 1 is a diagrammatic view of a taximeter vehicle equipped with my new electric controlling system; Fig. 2 is a cross section of the flag switch; Fig. 3 is a vertical section thereof and Fig. 4 is a vertical section of the main seat and the switch therein.

10 denotes a taximeter vehicle of usual construction, employing for example a high tension magneto 11 to produce ignition. 12 denotes the usual flag controlled fare register or clock, 13 and 14 the seats and 15 the floor of the passenger compartment. 16 denotes a switch adapted to be controlled from the flag handle 12'; 17, 18 and 19 the switches controlled by pressure, as by the weight of the passenger. The switch 17 is arranged under the main seat, 18 at the back of the auxiliary seat and 19 under the floor of the passenger compartment. Adapted to be operated by the accelerator pedal or lever 20 is a switch 21, which may be of any suitable construction. In the present embodiment, I have shown the same to consist of stationary contact members 22 arranged in a suitable casing 23 below the floor 24 of the driver's compartment and a spring actuated pin or button 25 projecting through said floor 24 and adapted to be operated by the accelerator lever or pedal 20. When a magneto is used, I conductively connect the insulated contact thereof (not shown) with one of the stationary members 22 of the switch 21 and the other stationary contact member 22 to one 16' of the contacts of the flag switch 16 and the other contact 16² of said flag switch is connected to one of the contact members 17' of the main seat 17, the other contact member of said main seat switch is grounded as at 26 by connecting it to the frame of the vehicle or the like. The contacts 16' and 16² of the flag switch 16 are so arranged that normally, that is when the flag is up or in a position indicating "vacant" the contact members 16', 16² thereof are closed (as shown in Fig. 2). The switches 17, 18, 19 and 21 are normally open. When a passenger enters or seats himself in the car, the switches 17, 19 or 18 and 19 are closed. The driver is still in a position to start the motor with the flag in "vacant" position. But upon the depression of the accelerator pedal 20 to run the car with speed, without having previously lowered the flag, the ignition circuit becomes grounded and the motor stops.

The switch controlled by the flag handle may be applied to any suitable place, whereby it can be conveniently controlled from the flag handle. The construction and operation of the switch 16 by the flag handle may be the same as described in my former application. The switch 17 in the main seat may be constructed as follows:—The springs 27 supporting the upholstery 28 of the seat may be part of the switch 17. To this end, the upper ends of these springs are extended through the center of the coils and formed at their extreme ends with members constituting the contact members 17'. The other contact members 17² are fixed to the base frame 29 on which rest the springs 27. On the depression of the seat by the weight of the passenger and the resulting compression of the springs 27, the members 17' and 17² are brought into contact closing the switch.

What I claim and desire to secure by Letters Patent is:—

1. In a taximeter vehicle, the combination with a fare register having a "flag", the power controlling means and an electric source, of an electric switch controlled by said "flag", an electric switch controlled through said power controlling means, a switch controlled by an occupant of the passenger compartment, and electric connections such that when the passenger compartment is occupied and the "flag" is in "vacant" position the transmission of power to the vehicle will be affected.

2. In a taximeter vehicle, the combination with a fare register having a flag handle, an electric ignition system and gas controlling means, of a switch controlled through said handle, a switch controlled through said gas controlling means, a switch controlled through the occupant of the passenger compartment and electric connections leading from the ignition system through said switches to the ground, so that when the passenger compartment is occupied and the gas controlling means is acted upon, while the flag handle is in "vacant" position, the circuit of the ignition system will be grounded or short-circuited preventing the starting of the motor.

In testimony whereof I affix my signature in presence of two witnesses.

ABRAHAM WEISS.

Witnesses:
NAN S. ORDMANN,
JOSEPH T. MCMAHON.